United States Patent [19]

Schwede et al.

[11] Patent Number: 5,074,587
[45] Date of Patent: Dec. 24, 1991

[54] SELF-SUPPORTING MOTOR-VEHICLE

[75] Inventors: Wolfgang Schwede; Rolf Maier; Bernd Christoph, all of Sindelfingen; Heinrich Weber, Wolfschlugen; Manfred Flaig, Ost-Fildern; Hans-Jürgen Stumpe, Ostfildern, all of Fed. Rep. of Germany

[73] Assignee: Daimler-Benz AG, Fed. Rep. of Germany

[21] Appl. No.: 483,652

[22] Filed: Feb. 23, 1990

[30] Foreign Application Priority Data

Feb. 24, 1989 [DE] Fed. Rep. of Germany ....... 3905650

[51] Int. Cl.$^5$ ............................................ B62D 21/00
[52] U.S. Cl. .................................. 280/781; 180/311; 296/204; 296/30
[58] Field of Search ................ 180/311, 312; 280/781; 296/188, 204, 30

[56] References Cited

U.S. PATENT DOCUMENTS

| | | | |
|---|---|---|---|
| 1,476,062 | 12/1923 | Eccles | 280/781 X |
| 1,917,894 | 7/1933 | MacPherson | 180/312 X |
| 1,976,071 | 10/1934 | Hoffman | 280/781 X |
| 2,212,636 | 8/1940 | Dorris | 280/781 X |
| 2,289,470 | 7/1942 | Vincent | 296/204 |
| 2,311,419 | 2/1943 | Ulrich | 180/312 |
| 2,851,302 | 9/1958 | Owen | 180/311 X |
| 2,997,313 | 8/1961 | Wall | 280/106.5 |
| 3,499,661 | 3/1970 | Rowe | 280/106 |
| 4,163,578 | 8/1979 | Watson | 296/204 |

FOREIGN PATENT DOCUMENTS

| | | |
|---|---|---|
| 767141 | 3/1952 | Fed. Rep. of Germany . |
| 951549 | 10/1956 | Fed. Rep. of Germany . |
| 2847679 | 5/1980 | Fed. Rep. of Germany . |
| 304886 | 1/1929 | United Kingdom . |
| 1327178 | 8/1973 | United Kingdom . |

OTHER PUBLICATIONS

"Automobil Revue" #1969.
ATZ (Automobiletechnische Zeitschrift) 90 (1988), "Toyota Celica Turbo 4WD"-pp. 384-386.
"Die Auto-Zeitschrift"-Porsche Turbo: Power und Prestige, pp. 113, 114, 116, 117.

Primary Examiner—Charles A. Marmor
Assistant Examiner—Tamara L. Finlay
Attorney, Agent, or Firm—Evenson, Wands, Edwards, Lenahan & McKeown

[57] ABSTRACT

A self-supporting motor-vehicle body includes outer lateral side members (sills) on a substructure in the region of the passenger cell, and front and rear side members which are angularly offset relative to a longitudinal center axis of the vehicle and respectively located at a vehicle forward structure and at a vehicle rearward structure. The front and rear side members adjoin the lateral side members via a bent portion. In order to provide stiffening of the body, struts are secured to the substructure of the body so as each to be fastened at one end to a lateral side member, and directed towards a middle region of the vehicle with their other end fastened once again to the substructure of the body. A front strut is guided from each of the two lateral side members into the vehicle forward structure and/or a rear strut is guided from each of the two lateral side members into the vehicle rearward structure, with each strut preferably being aligned at an angle of approximately 45° relative to the longitudinal axis of the vehicle, and extending along the substructure at least into the middle region of the vehicle.

5 Claims, 3 Drawing Sheets

5,074,587

SELF-SUPPORTING MOTOR-VEHICLE

BACKGROUND AND SUMMARY OF THE INVENTION

The present invention generally relates to a self-supporting motor vehicle body, and more particularly to a self-supporting motor vehicle body for increasing the body strength of a motor vehicle against torsinal vibrations about a longitudinal axis of the vehicle.

Self-supporting bodies of this type are familiar from the series production of motor vehicles and are disclosed, for example, by German Published Unexamined Patent Application (DE-OS) 2,847,679.

Meeting stability and safety requirements on motor vehicles, motor vehicle bodies typically comprise lateral, front and rear side members, although these members cannot merge into one another in a straight line since the front and rear side members have to be set back towards the middle of the vehicle in front of the wheel installation space. The resulting bent connection of the side members to one another means that, the stabilization of the body, especially on open vehicles lacking a roof which increase rigidity, is too low against torsional vibrations about a longitudinal axis of the vehicle. As a consequence of this, motoring comfort is impaired since the torsional vibrations generated during motoring are experienced by the vehicle occupants as so-called cross-jolting.

An object on which the present invention is based is to increase the body strength of a motor vehicle against torsional vibrations, thereby reduce the extent of the maximum torsional vibration amplitudes and increase the natural torsional frequency value of the body and consequently set it further apart from the natural torsional frequency of the wheels and wheel axles.

These and other objects of the present invention are achieved by providing struts aligned and secured to the body substructure in such a way that the torsional amplitudes of the body are reduced and that the torsional stability of the body is increased or its natural torsional frequency rises into a range several Hertz higher.

This arrangement assures that the torsional vibrations occurring during motoring are perceived by the vehicle occupants to a far lesser extent, and that the higher stability of the body has a more beneficial effect on built-in fittings, such as, for example, a front windscreen. This solution for an improvement of stability is expedient, above all, for motor vehicles without a fixed roof. It is likewise advantageous that the higher natural torsional frequency of the body is now further above that of the wheels together with their wheel axles, so that the body is not additionally excited by the vibrations of these structures.

With an alignment of the struts at approximately 45° relative to the longitudinal axis of the vehicle, the effect of the strut of supporting a dynamically changing tensile and compressive load is at its greatest. If a strut were possibly aligned in a longitudinal direction of the vehicle, it would be subjected, above all, to bending stress as a result of a likewise occurring transverse movement of the forward structure or rearward structure in relation to the passenger cell and would therefore have to be designed for a higher load, whilst a strut aligned in the transverse direction of the vehicle is far less effective for increasing the stability.

For a strut according to preferred embodiments of the invention, therefore, it is sufficient to profile the strut in such a way that it withstands a dynamic tensile and compressive load and that it can be matched especially simply to the prevailing conditions of the substructure.

The struts perform their function in the region of both the forward structure and the rearward structure, increase the torsional stability diminished by the bending of the front and rear side members in relation to the lateral side members and reduce the transverse movement of the forward structure and of the rearward structure relative to the stable passenger cell.

Other objects, advantages and novel features of the present invention will become apparent from the following detailed description of the invention when considered in conjunction with the accompanying drawings.

BRIEF DESCRIPTION OF THE DRAWINGS

FIG. 2 shows a representation of torsional vibrations related to the body of FIG. 1, with the arrangement of the struts and of the passenger cell drawn in.

DETAILED DESCRIPTION OF THE DRAWINGS

Figure 1:
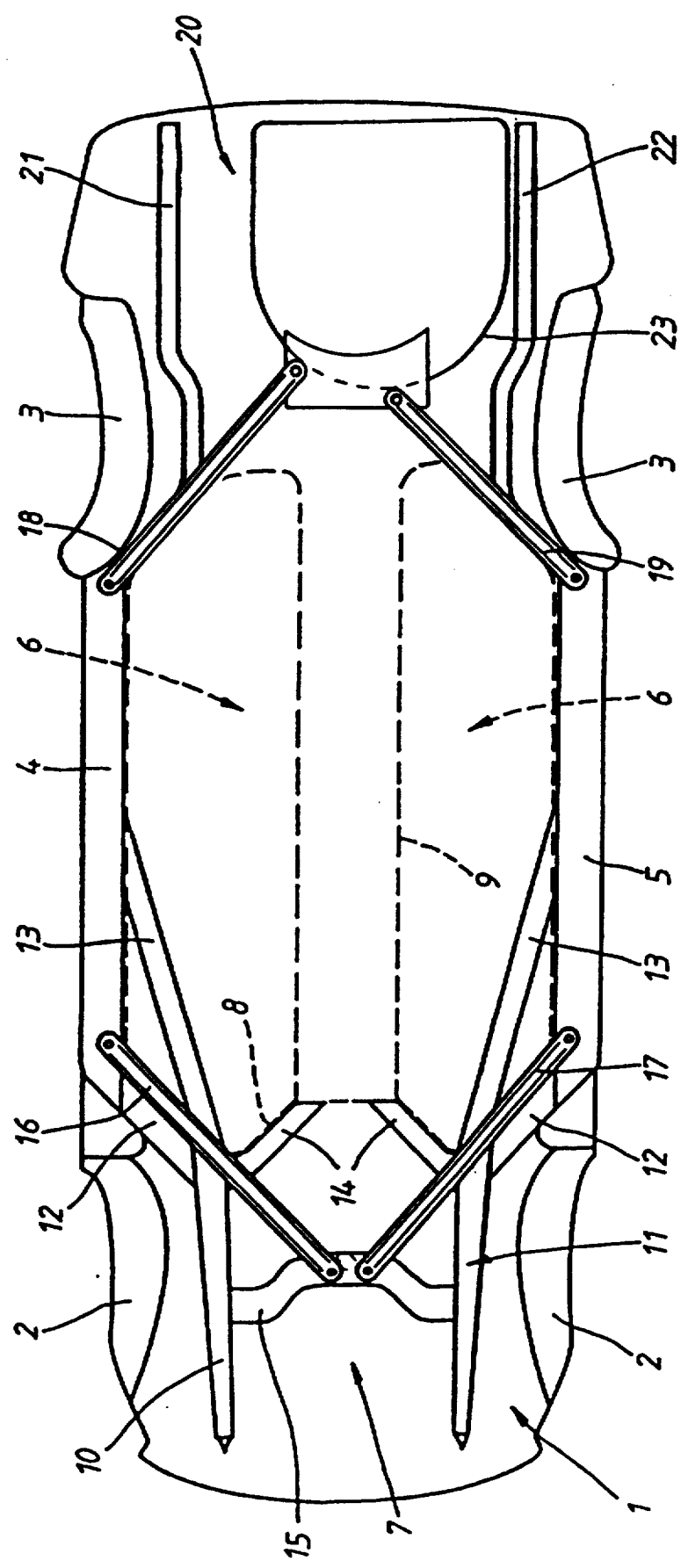
FIG. 1 shows a bottom view of a sketched-out substructure of a motor-vehicle body with side members and struts according to preferred embodiments of the invention.

Exemplary embodiments of the present invention are shown in the drawings and discussed below.

FIG. 1 shows a partially bottom view of a substructure 1 of a motor-vehicle body, on which are respectively arranged front and rear wheel openings 2, 3 and lateral side members (sills) 4 and 5 located between these openings 2, 3 in a longitudinal direction of the vehicle. These lateral side members 4 and 5 constitute approximately the lateral limitation of a passenger cell 6, represented by broken lines, which is located above the substructure 1 in terms of the vehicle height and which terminates in an end wall 8 towards a vehicle forward structure 7, the end wall 8 together with a body tunnel 9, formed in the middle region of the vehicle in a longitudinal direction of the latter, structurally stabilizing the passenger cell 6.

Likewise secured to the substructure 1, in the vehicle forward structure 7, are two front side members 10 and 11 which, to provide room for fixing a front-wheel axle, are offset towards the longitudinal center axis of the vehicle. To ensure good impact stability of the body, the two front side members 10 and 11 each possess, towards the passenger cell 6, a fork having two arms 12 and 14 which form a fork brace and a third arm 13 which forms a connecting member. One arm 12 of the fork brace and the connecting member 13 merge into the respective lateral side members 4, 5 and the arm 14 is supported on the tunnel 9. Furthermore, the substructure 1 also has an engine cross-member 15 integral with the body.

According to preferred embodiments of the present invention, secured to the substructure 1 of the body are struts 16, 17 and 18, 19 which are each attached firmly, for example, by screws at one end to one of the lateral side members 4, 5 and are aligned towards the middle region of the vehicle and which at their other end are fastened once again to the substructure 1 of the body. At the same time, each strut 16, 17, 18, 19, aligned at an angle of approximately 45° relative to the longitudinal axis of the vehicle, extends along the substructure 1 at least into a middle region of the vehicle.

Front struts 16, 17 lead from respective lateral side members 4 and 5 into the vehicle forward structure 7 and in one embodiment, are attached firmly for example, by screws to the engine cross-member 15 integral with the body. The front structure 16, 17 approximately span the bent transition from the lateral side members 4 and 5 to the associated front side members 10 and 11, with the result that they increase the natural torsional frequency of the body.

Accounting to a further embodiment, there can likewise be rear struts 18, 19 which each lead from a lateral side member 4, 5 into a vehicle rearward structure 20. To secure the rear struts 18 and 19 in the vehicle rearward structure 20, a screw connection to a bracket affording high rigidity and belonging to a spare-wheel recess 23 can be selected, for example.

Any sufficiently rigid body part is suitable for securing the struts 16, 17, 18, 19 in the middle region of the vehicle. So far as it is possible in installation terms, the struts should be fastened as near as possible to the longitudinal center axis of the vehicle and can additionally be mounted on the substructure 1 of the body over some of their length.

It is sufficient to choose a flat profile for the design of these struts 16, 17, 18, 19 since, as a result of their alignment at 45° relative to the longitudinal axis of the vehicle, they are subjected to dynamic tensile and compressive loads, above all at high frequency, by the torsional vibrations occurring during motoring. However, any other profile for which the installation space provided on the substructure is sufficient can also be used.

Figure 3:
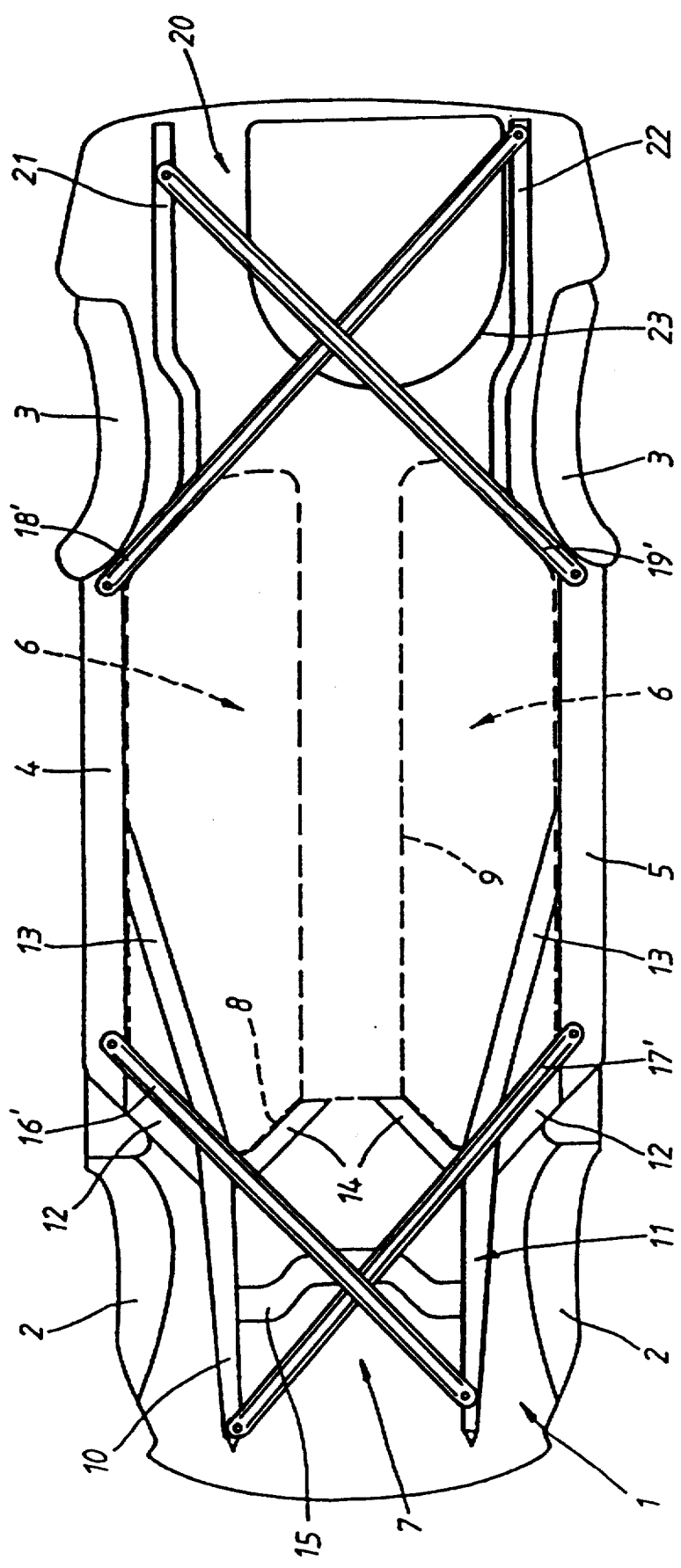
FIG. 3 shows a bottom view similar to FIG. 1 but of a different embodiment where struts intersect in the middle region of the vehicle and are fastened at each end to the substructure on opposite sides of the vehicle.

Furthermore, the struts 16', 17', 18', 19' as shown in FIG. 3 can also be designed in such a way that, after being secured to the lateral side members 4, 5, they intersect in the middle region of the vehicle from the respectively opposite sides, are guided, with an alignment at about 45° relative to the longitudinal axis of the vehicle, to the opposite vehicle side and there are fastened to the substructure 1 of the body.

Figure 2:
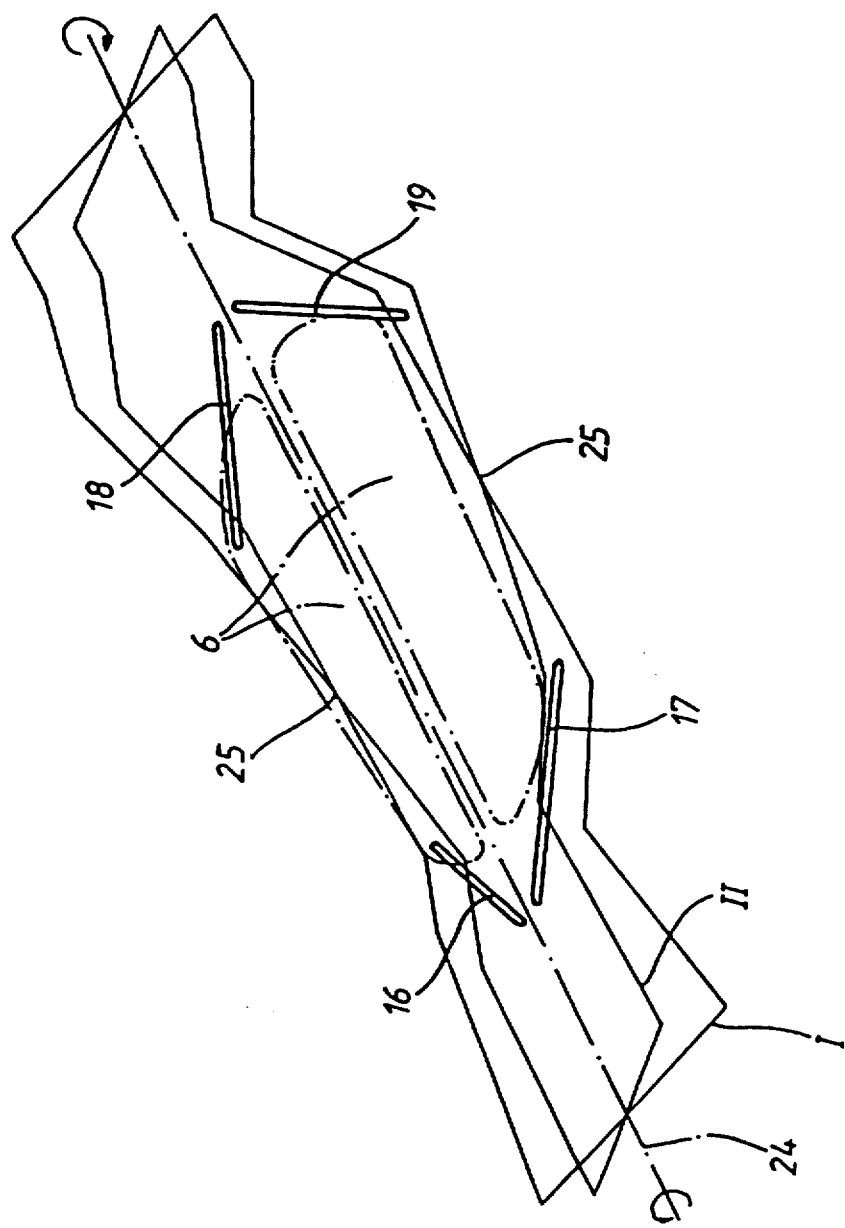

FIG. 2 shows two thinly drawn possible paths I and II of maximum torsional amplitude over the motor vehicle during motoring. The diagram shows that the torsional amplitudes are at their highest in the lateral regions of the vehicle and have a vibration zeroline 24 along a longitudinal axis of the vehicle and, approximately at lateral mid-length, a zeropoint 25 at which the respective associated direction of vibration is reversed.

In addition, this diagram shows the front struts 16, 17, the rear struts 18, 19 and the passenger cell 6 in a vibrational mid-position.

It can be seen that, in this version too, the struts 16, 17, 18, 19, by which approximately the bent region from the lateral side members 4, 5 to the front side members 10, 11 and the rear side members 21, 22 is spanned, in order to increase the body rigidity and the natural torsional frequency, are guided out of the region with high torsional vibrations into a region of low vibrational amplitude. This vibrational amplitude can be zero or, as a result of the transverse movement of the forward structure 7 or rearward structure 20 relative to the passenger cell 6, also in phase opposition.

The result of this, together with the alignment of the struts 16, 17, 18, 19 at about 45° relative to the longitudinal axis of the vehicle, is that the struts 16, 17, 18, 19 would allow a movement of their fastening point on their associated lateral side members 4, 5 over a radius, but this vibrates in the direction of a major axis of the vehicle, and therefore the amplitude of this torsional vibration is reduced by the inhibiting struts 16, 17, 18, 19, these experiencing an alternating tensile and compressive load.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A self-supporting body of a motor-vehicle, comprising:

a substructure of the body;

outer lateral side members on the substructure of the body in a region of a passenger cell of the vehicle;

front and rear side members angularly offset relative to a longitudinal center axis of the vehicle and respectively located at a vehicle forward structure and at a vehicle rearward structure so as to adjoin the lateral side members at a bent portion and, together with the outer lateral side members, defining a substructure plane; and struts secured to the substructure substantially within the substructure plane so as to each be fastened at one end to one of the outer lateral side members and directed towards a middle region of the vehicle with their other end fastened once again to the substructure of the body, the struts including front struts guided from each of the two lateral side members into the vehicle forward structure and rear struts guided from each of the two lateral side members into the vehicle rearward structure, each of the struts being aligned at an angle of substantially 45° relative to a longitudinal axis of the vehicle, and extending along the substructure at least into a middle region of the vehicle.

2. A self-supporting motor-vehicle body according to claim 1, wherein the struts are flat sections.

3. A self-supporting motor-vehicle body according to claim 1, wherein each of the front struts is fastened at one end in the middle region of the vehicle to an engine crossmember integral with the body.

4. A self-supporting motor-vehicle body according to claim 1, wherein each of the rear struts is fastened at one end to a bracket of a spare-wheel recess.

5. A self-supporting motor-vehicle body according to claim 1, wherein the struts intersect in the middle region of the vehicle and at one end are fastened to the substructure of the body on an opposite side of the vehicle.

* * * * *